A. J. MYER.
Meteorological-Instrument.
No. 216,440. Patented June 10, 1879.
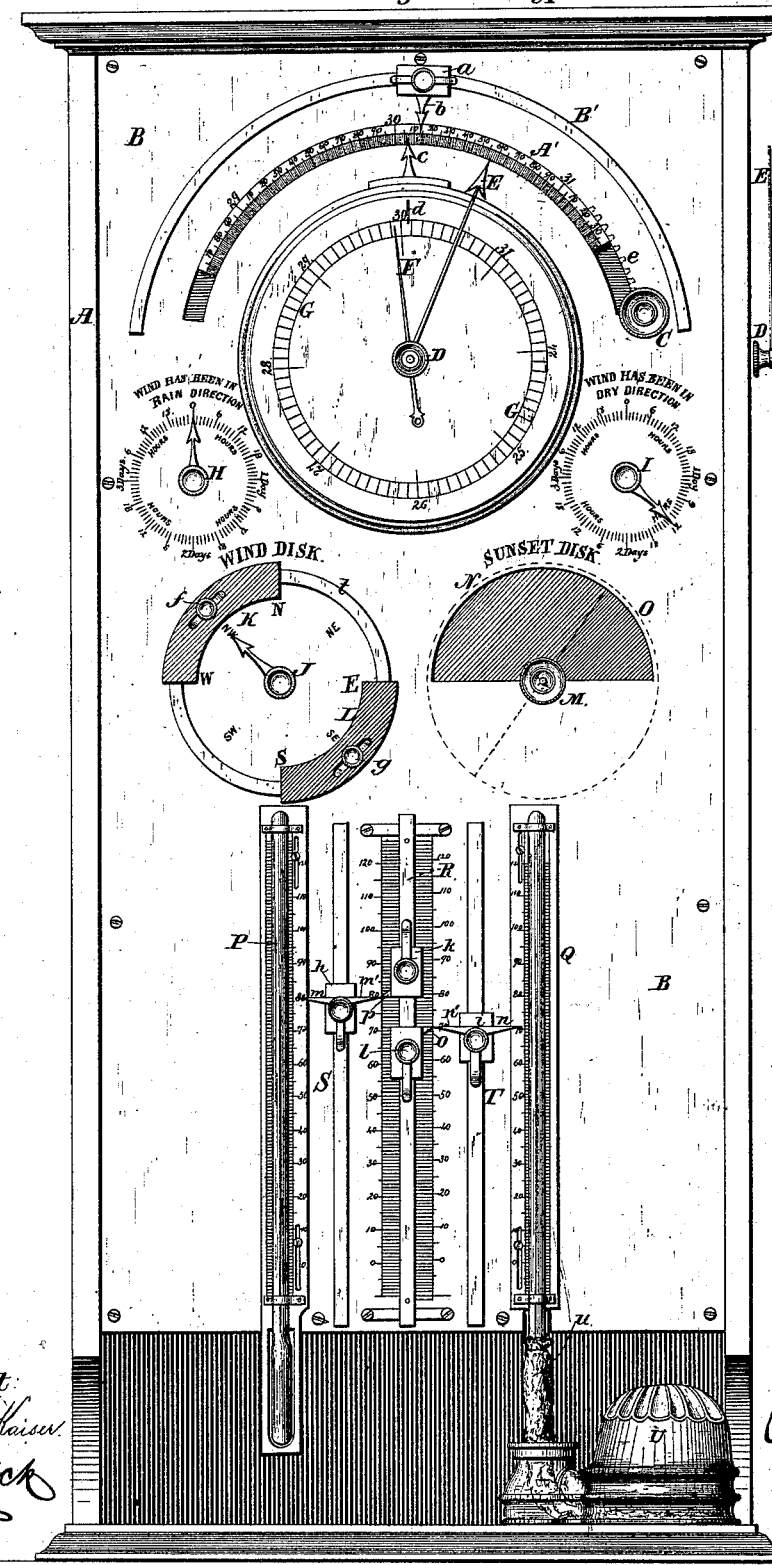
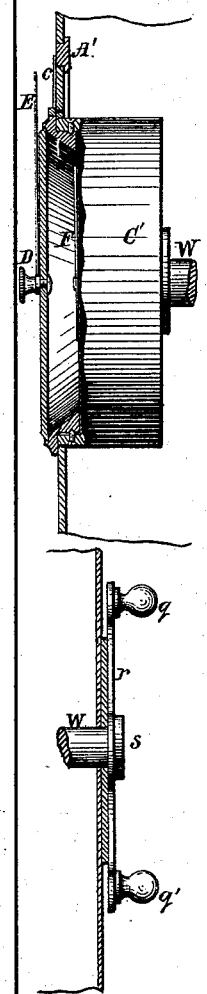
Attest:
J. Henry Kaiser.
E. A. Dick
Inventor:
Albert J. Myer
by A. Pollok
his attorney

UNITED STATES PATENT OFFICE.

ALBERT J. MYER, OF THE UNITED STATES ARMY.

IMPROVEMENT IN METEOROLOGICAL INSTRUMENTS.

Specification forming part of Letters Patent No. 216,440, dated June 10, 1879; application filed March 22, 1879.

*To all whom it may concern:*

Be it known that I, ALBERT J. MYER, of the United States Army, have invented a new and useful Improvement in Meteorological Instruments, which improvement is fully set forth in the following specification.

In endeavoring to determine or forecast the character of the weather which may be expected, say, on the following day, neither the atmospheric pressure as indicated by the barometer, nor the temperature and moisture of the air as determined by the wet and dry bulb thermometers, nor the direction and continuance of the wind, nor the appearance of the sunset can alone can be relied upon to furnish indications at all satisfactory or trustworthy. It is necessary to consider them in connection with each other, and when separate observations are taken with different instruments it is difficult and requires considerable skill to combine the independent readings.

To combine and arrange instruments to give the indications above mentioned in a simple form in one plane or upon the face of one case, so that the eye can at a glance take in and the mind thus grasp at the same time without special instructions the several atmospheric conditions, and know their meaning for common and every-day use by simple rules, is more particularly the object of this invention, which consists in a weather case or indicator in which such instruments are so combined and arranged, and also in particular instruments, their construction, and combination, and arrangement of parts, as hereinafter more fully set forth.

In the drawings, Figure 1 represents a front view of the weather-case; and Fig. 2, views, in section, of the barometer.

A is the frame or casing for inclosing the several instruments.

Upon the face B of the case the several pointers, indicators, and graduations or gages of the different instruments are seen.

In the upper part of the face or front of the case is an opening covered with glass for inspecting the graduated face G and pointer F of a barometer of the class called "aneroid barometers." This barometer C', Fig. 2, is not fixed, but may be revolved by means of the shaft W through the handles $q\ q'\ r$, secured at the outer end of said shaft by the screw $s$, and prevented from turning independently of the shaft by pins which project through holes in the part $r$ of the handles or by other suitable means. The amount of revolution is indicated by the small fixed pointer $d$.

Above the barometer is a graduated arc, A', adjustable in a suitable opening by means of the milled head C, which operates by a connected shaft and pinion the rack $e$ attached to the arc. Instead of an arc a complete circle may be used.

A fixed index, $c$, indicates by the figure to which it points when the graduated arc called the "main barometer scale" is set, in the same manner as the pointer $d$ indicates the setting of the barometer.

The pointer $b$, carried by a slide, $a$, movable on the brass arc B', is adjustable at any point of the main barometer-scale, being retained in position by a spring. E is a long pointer attached by a pin with a milled head, D, to the glass covering the barometer-face.

H I are pointers on the right and left below the barometer, and adapted to be turned by suitable milled heads over graduations representing hours and days arranged in circles.

The wind-disk is composed of a pointer, J, and two arcs, K L, which are adjustable on the ring $t$, being held in position thereon by springs pressed against it by the screws $f\ g$. Inside this ring letters indicating the points of the compass are placed. The arcs K and L are ordinarily colored red and blue, respectively, and called the dry and wet wind arcs.

The sunset-disk is composed of two differently-colored portions, N, say red, and O, blue. One-half only of the disk is visible at one time; but by revolving it by means of the milled head M, either of the differently-colored portions may be brought into sight separately, or portions of both. At the lower part of the weather-case the thermometers are secured.

P is the dry-bulb thermometer, and Q the wet-bulb, with its reservoir U and wicking $u$, the said reservoir being preferably on the principle of a reservoir-fountain. By the use of the fountain-reservoir not only is the supply of water longer maintained, but, being kept at nearly a constant level, the absorption is more uniform.

S T are rods or ways, on which slides h i, carrying pointers m m' and n n', are movable, suitable springs serving to retain the slides in the position in which they are placed. R is a similar rod, on which two slides, k l, with pointers p and o, are movable over a graduated scale. Upon the face B may be placed remarks or rules for showing the manner of using the several instruments and for predicting the weather from the indications thereby given, which rules or remarks may be disposed over the particular instruments to which they relate, and in available blank spaces.

The weather-case is provided with a hinged glazed door, (not shown,) the lower part, however, being open and provided with bars to form a grating, so that free access of air to the thermometer-bulbs is permitted.

The operation and manner of using the instrument or weather-indicator are as follows: The barometer is set by turning it till the pointer d indicates the mean or average barometer-reading for the month at the place where the observations are taken, which mean reading may first be ascertained by experiment, or from any competent source of information.

In like manner the main barometer-scale is set. The short pointer, F, indicates the existing pressure of the atmosphere at the time of observation, and the long pointer, E, if made to just cover it, will show the reading upon the scale A'. The pointer b being brought to indicate the same number will, when the next reading is taken, show by comparison therewith whether the barometer has risen or fallen, and the pointer c shows whether this is above or below the mean for the month.

The disk K is adjusted on the ring t, so that the edges are at those points of compass from which, or from points between which, as previously ascertained, the winds come which are most likely during the month, and at the place of observations, to be followed by dry weather.

In like manner the disk L is set for wet winds. The pointer J, then, if set by a neighboring vane, will indicate the direction of the wind, and also it will be seen whether it is a dry or wet wind, or doubtful. If the wind is from a dry quarter the time at which it commenced to blow should be written down. The pointer I is set for indicating the length of time which it has been blowing continuously.

In like manner, if the wind is from a wet quarter the pointer H is turned to indicate its duration.

When the next observation is made it may be told from the position of the pointer J, which remains as previously set, whether the wind has or has not shifted.

The sunset-disk is turned to expose the portion N if the sunset be such as to indicate that the following day will be fair or without rain; but if the sunset indicate foul or rainy weather the disk is turned to expose the portion O; and if the character of the sunset is doubtful both portions are brought partly into view.

The pointers m n are set according to the state of the thermometers P Q, and the distance between them is indicated by the slides k l, which are set according to the pointers m' n'. At the next observation not only can the actual temperatures be obtained, but they may be compared with those last taken, and it can also be readily shown by the slides or keepers k l whether the difference between the wet and dry bulb thermometers is increasing or diminishing—that is, whether the relative proportion of moisture is becoming less or greater, and the air drier or more moist.

From the above description it will be perceived that the indications upon the face of the weather-case show at once whether the barometer is "high"—that is, above the mean, and "rising," or "low and falling;" whether the wind is from a dry or wet quarter, and the time it has been so blowing; whether the sunset when examined was considered as indicating fair or foul weather, and whether the amount of moisture in the air is increasing or not, as well as the temperature and actual barometric pressure.

A fair-weather sunset, a high and rising barometer, the wind in a dry quarter, especially if it be steady, and the difference between the wet and dry bulb thermometers increasing are all considered indications of pleasant weather; and the contrary is the case with a foul-weather sunset, a low and falling barometer, the wind in a wet quarter, and the wet and dry bulb thermometers approaching. So the character of the weather may be shown by three of the indications. If the indications are divided and point in opposite directions, weight must be given to each as experience may show its correctness.

In the drawings I have shown a single barometer-scale divided by inches; but additional or different scales might be used, which could be divided by centimeters or other measures, and the divisions readily translated one into the other.

It is also evident that an additional number of pointers could be used, and that if the pointers H I were omitted the indications furnished would still be satisfactorily used. Another dial might be added, so as to note the time at which the wind began to blow from a certain quarter, if thought desirable.

Having thus described my said invention and the manner in which the same is or may be carried into effect, what I claim, and desire to secure by Letters Patent, is—

1. A weather case or indicator combining instruments for indicating upon its face the character of the wind and of the sunset, and for furnishing barometrical and thermometrical indications, substantially as described.

2. The combination, with an aneroid barometer provided with a long pointer, of an enlarged scale (main barometer-scale) surrounding in whole or in part said barometer, substantially as described.

3. The combination, with an aneroid barometer and an enlarged barometer-scale surrounding the same in whole or in part, of a curved arc surrounding said scale and a pointer movable on said arc, substantially as described.

4. The combination of the barometer and enlarged barometer-scale and mechanism for setting the same with reference to a fixed point to indicate mean barometrical pressures, substantially as described.

5. The wind-disk composed of a ring, two segments or arcs movable thereon, a pointer, and letters indicating the points of the compass, arranged upon the face of the instrument, substantially as described.

6. The sunset-disk, having different-colored portions, and supported on an axle behind a suitably-shaped aperture, substantially as described, whereby one only of said colored portions or parts of both may be exposed to view, as set forth.

7. The combination, with a wet and a dry bulb thermometer provided each with a slide and pointers, of an intermediate comparative scale, with or without slides or keepers movable over said scale, substantially as described.

8. The combination in one instrument, to be known as a "weather case or indicator," of a barometer with its enlarged scale and pointers, a wind-disk, two dials with pointers for indicating the duration of the wind from certain quarters, a sunset-disk, and a wet and dry bulb thermometer with intermediate scale and slides, the said devices being arranged upon the face or front of said weather case or indicator, substantially as described, the face bearing legibly suitable remarks or rules, as set forth.

In testimony whereof I have signed this specification in the presence of two subscribing witnesses.

ALBERT J. MYER.

Witnesses:
E. A. DICK,
A. POLLOK.